(12) United States Patent
Doorley et al.

(10) Patent No.: US 9,855,925 B2
(45) Date of Patent: Jan. 2, 2018

(54) CONTROL FOR PASSIVE WIPER SYSTEM

(71) Applicant: Waymo LLC, Mountain View, CA (US)

(72) Inventors: Graham Doorley, San Jose, CA (US); Paul Thomas Hansen Karplus, Sunnyvale, CA (US); Peter Avram, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 266 days.

(21) Appl. No.: 14/529,920

(22) Filed: Oct. 31, 2014

(65) Prior Publication Data
US 2017/0151933 A1   Jun. 1, 2017

(51) Int. Cl.
| | |
|---|---|
| *B60S 1/56* | (2006.01) |
| *B60S 1/48* | (2006.01) |
| *B60S 1/08* | (2006.01) |
| *B08B 1/04* | (2006.01) |
| *H02P 7/06* | (2006.01) |
| *B08B 1/00* | (2006.01) |

(Continued)

(52) U.S. Cl.
CPC .......... *B60S 1/56* (2013.01); *B08B 1/00* (2013.01); *B08B 1/04* (2013.01); *B60S 1/08* (2013.01); *B60S 1/0848* (2013.01); *B60S 1/0896* (2013.01); *B60S 1/3404* (2013.01); *B60S 1/482* (2013.01); *B60S 1/486* (2013.01); *B60S 1/566* (2013.01); *G02B 27/0006* (2013.01); *H02P 7/06* (2013.01)

(58) Field of Classification Search
CPC .... B08B 1/005; B60S 1/04; B60S 1/46; B60S 1/566; B60S 1/56; B60S 1/486; B60S 1/0896; G02B 27/0006
See application file for complete search history.

(56) References Cited

U.S. PATENT DOCUMENTS

| | | |
|---|---|---|
| 3,832,750 A | 9/1974 | Jarvinen et al. |
| 5,208,938 A | 5/1993 | Webb |

(Continued)

FOREIGN PATENT DOCUMENTS

| | | |
|---|---|---|
| CN | 1928696 A | 3/2007 |
| CN | 201837825 U | 5/2011 |

(Continued)

OTHER PUBLICATIONS

International Search Report and Written Opinion for PCT/US2015/057074 dated Jan. 26, 2016.

(Continued)

*Primary Examiner* — Michael Kornakov
*Assistant Examiner* — Natasha Campbell
(74) *Attorney, Agent, or Firm* — Lerner, David, Littenberg, Krumholz & Mentlik, LLP

(57) ABSTRACT

A system includes a dome, a wiper assembly, a position sensor and a control device. The wiper assembly includes a wiper blade configured to rotate around the dome. The position sensor may be configured to send a signal to a control device when a wiper blade passes the position sensor. The control device may include one or more processors configured to receive the signal from the position sensor and determine a location of the wiper blade relative to the dome based on the received signal.

19 Claims, 9 Drawing Sheets

(51) Int. Cl.
B60S 1/34 (2006.01)
G02B 27/00 (2006.01)

(56) References Cited

U.S. PATENT DOCUMENTS

| | | | |
|---|---|---|---|
| 6,189,808 B1* | 2/2001 | Daniels | B60S 1/0822 |
| | | | 15/250.002 |
| 6,527,000 B1 | 3/2003 | Randmae et al. | |
| 8,567,963 B1 | 10/2013 | Criscuolo et al. | |
| 2005/0046372 A1* | 3/2005 | Heo | B60S 1/0818 |
| | | | 318/483 |
| 2008/0072393 A1 | 3/2008 | Tanaka | |
| 2013/0104933 A1 | 5/2013 | Aldred et al. | |

FOREIGN PATENT DOCUMENTS

| | | |
|---|---|---|
| CN | 102179389 B | 8/2012 |
| GB | 1361707 A | 7/1974 |
| GB | 2098467 A | 11/1982 |
| GB | 2507408 A | 4/2014 |
| JP | 2004-329497 A | 11/2004 |
| JP | 2007195037 A | 8/2007 |

OTHER PUBLICATIONS

International Preliminary Report on Patentability for PCT Application No. PCT/US2015/057074, dated May 11, 2017. 10 pages.

* cited by examiner

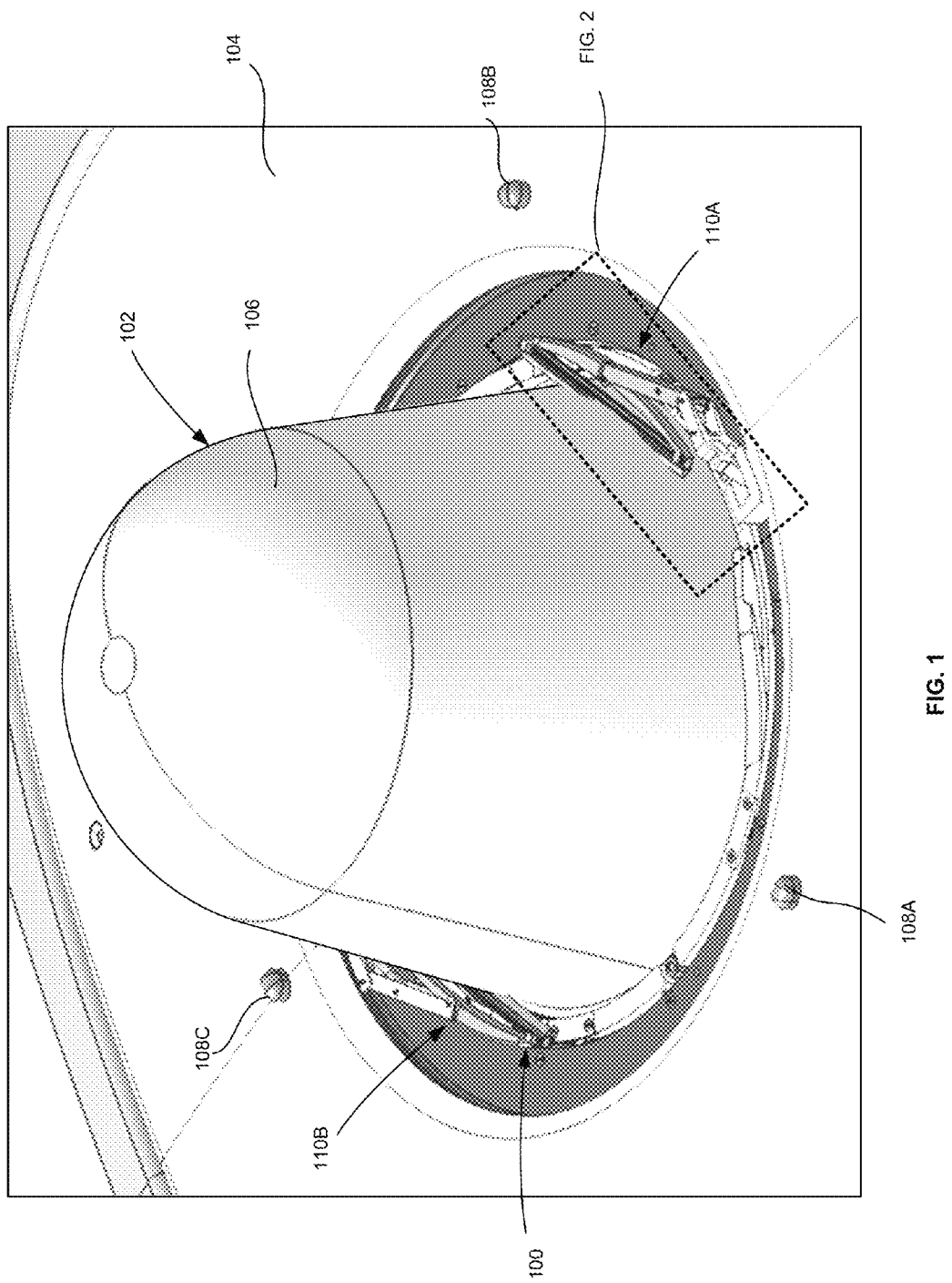

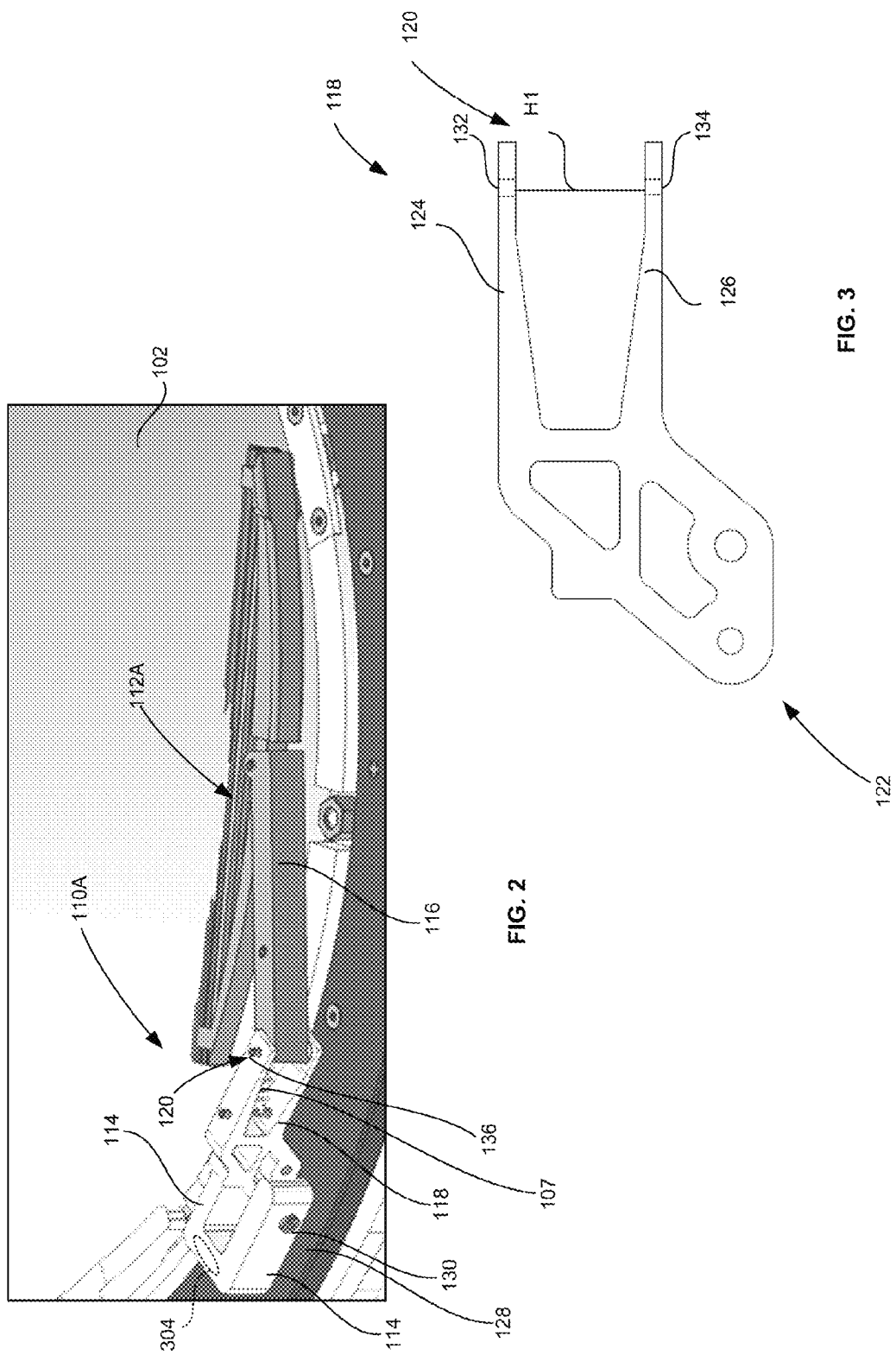

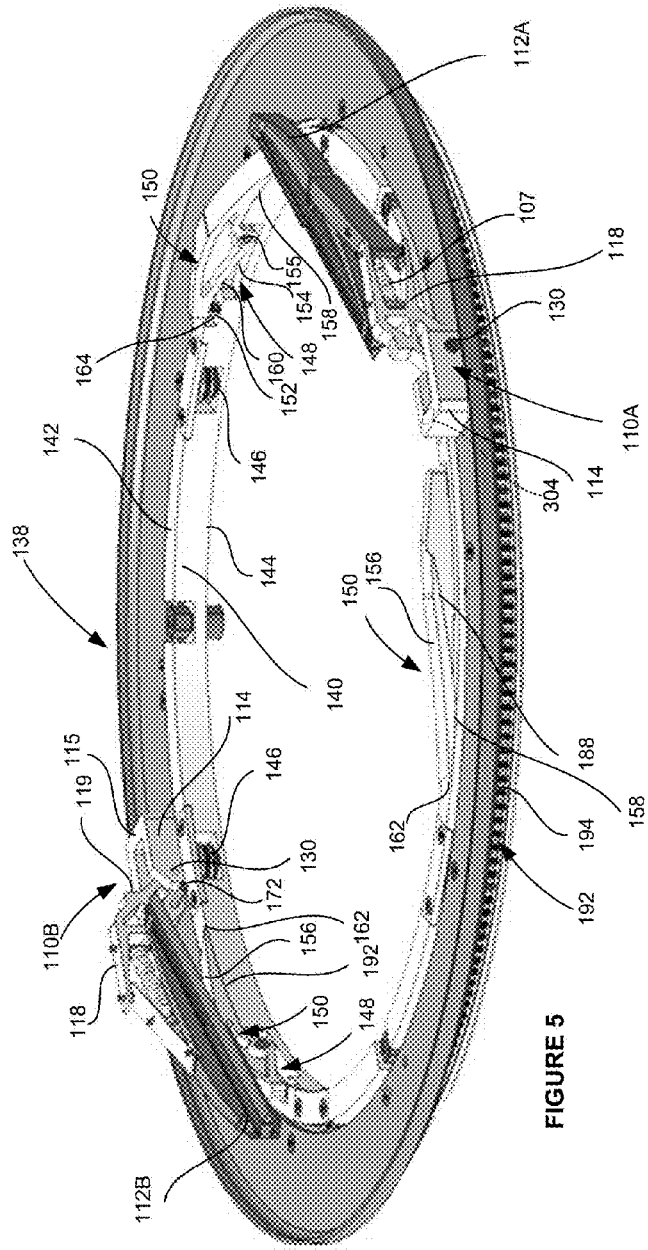
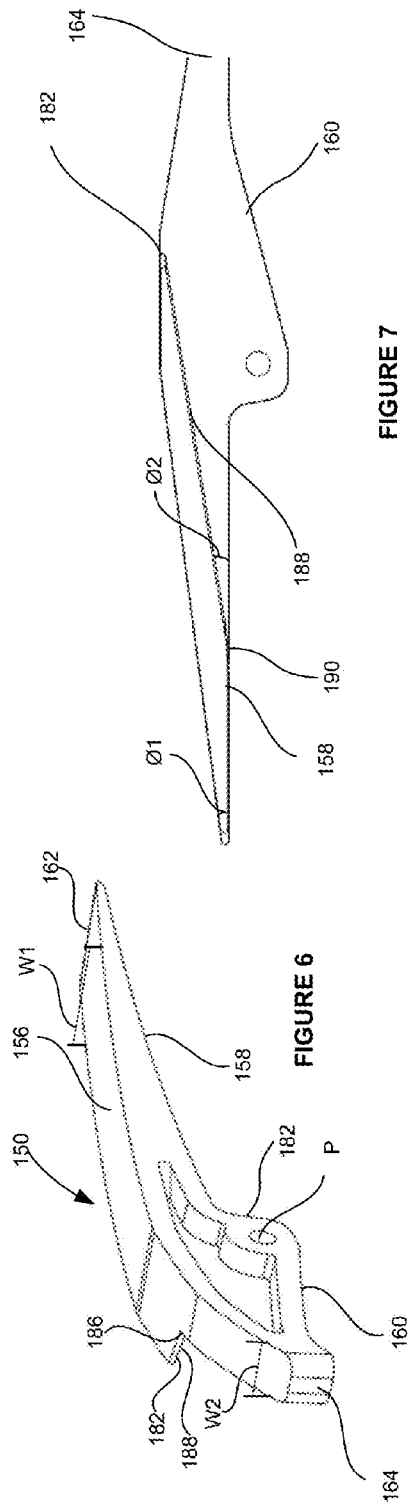

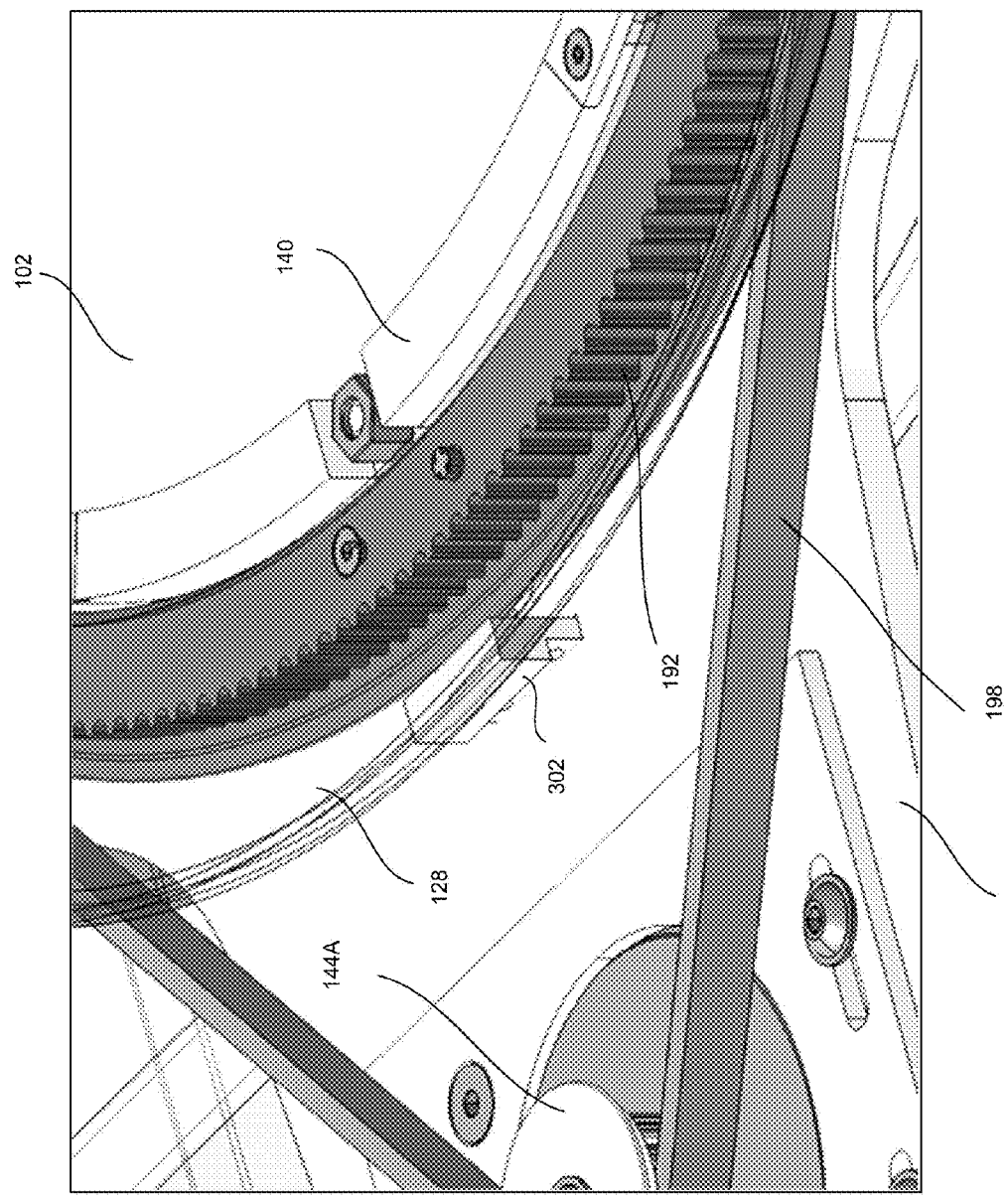

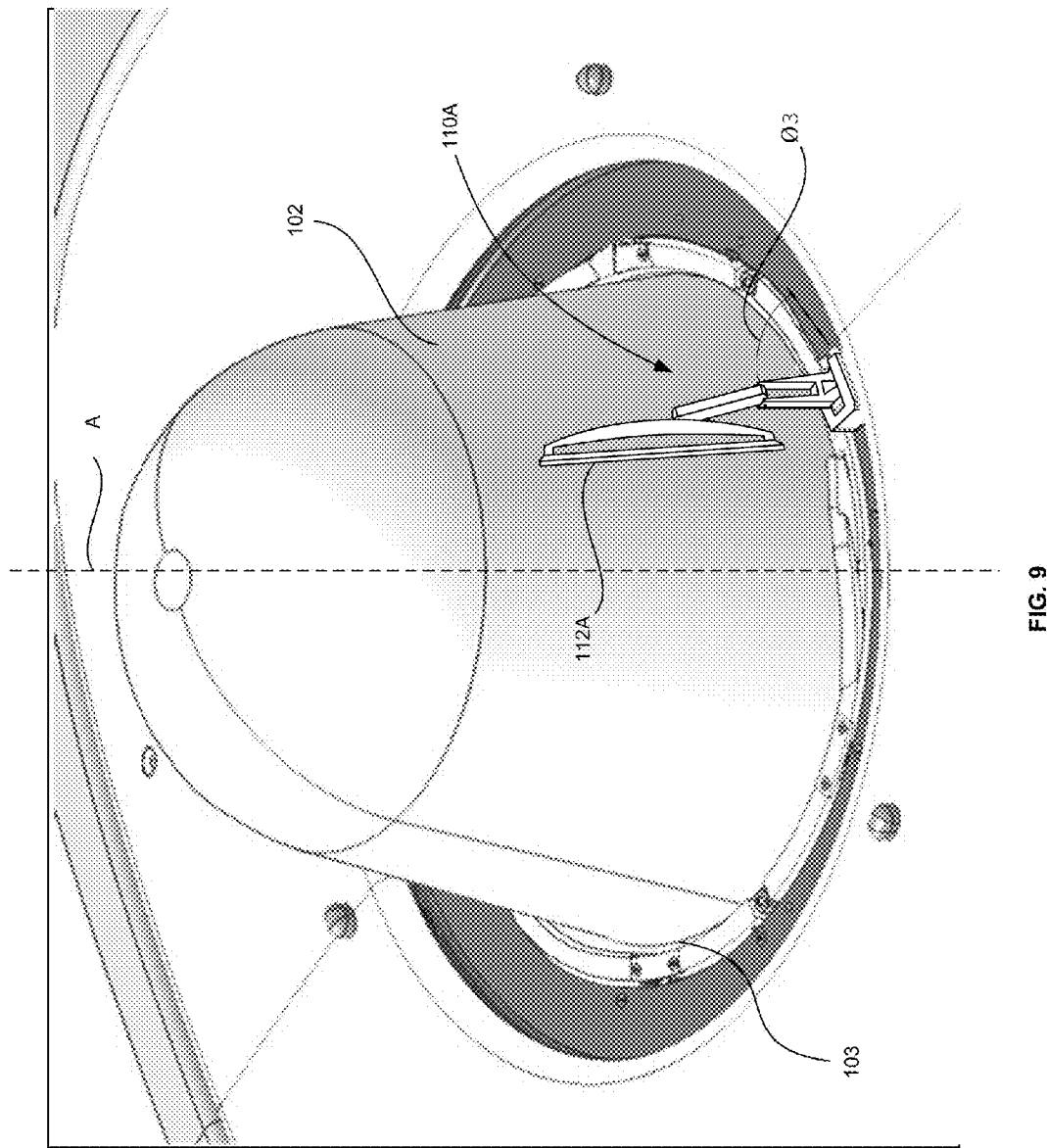

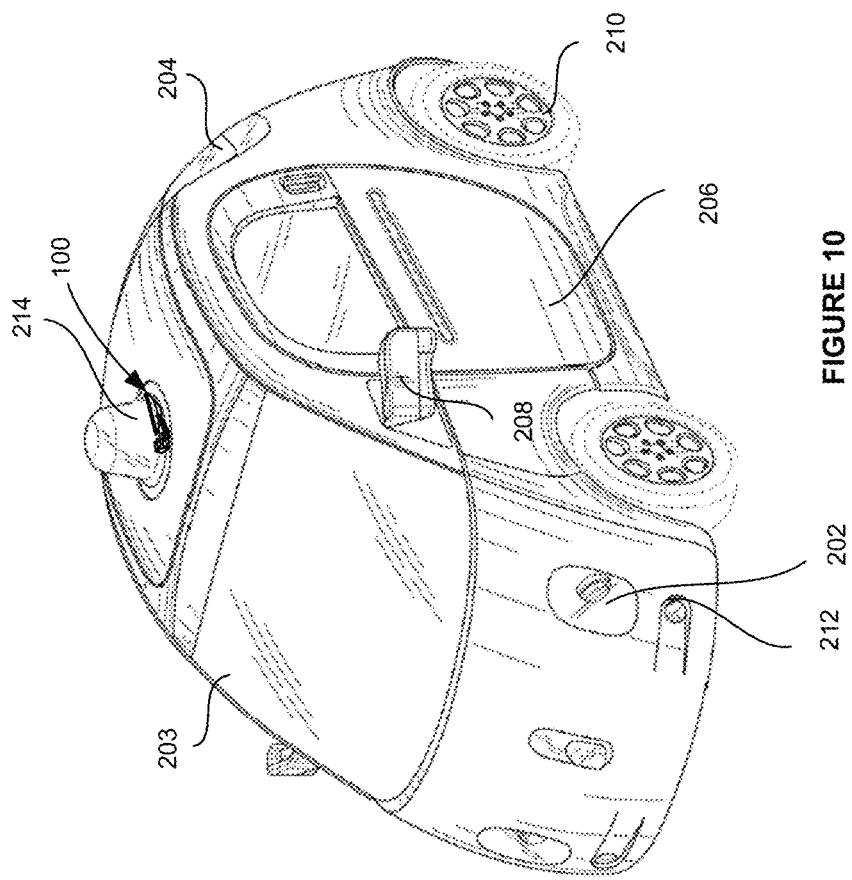

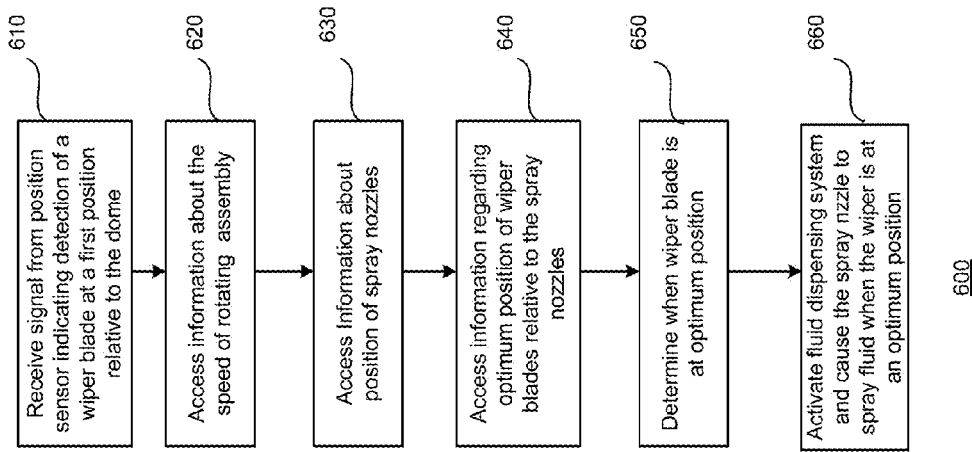
FIGURE 14
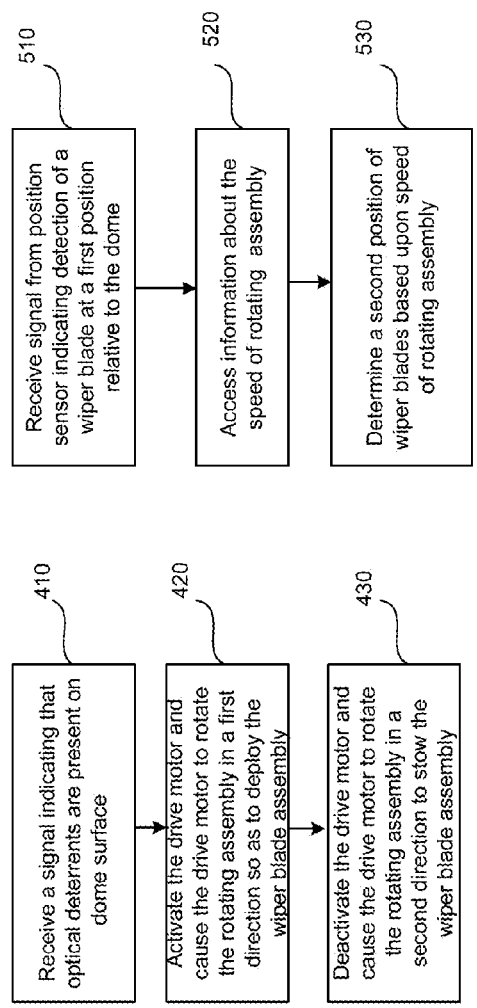
FIGURE 13
FIGURE 12

CONTROL FOR PASSIVE WIPER SYSTEM

CROSS REFERENCE TO RELATED APPLICATIONS

The present application is related to U.S. application Ser. No. 14/529,482, entitled Passive Wiper System, which was also filed on Oct. 31, 2014, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc. As an example, these systems may include sensors, such as laser scanning equipment and cameras, mounted at various locations on the vehicle.

In some instances, various optical deterrents, such as dust, dirt, and debris, can accumulate on the surface of housings for such sensors. These deterrents may occlude the sensors, can reduce the accuracy and reliability of information generated by the sensors. This, in turn, may impact the safe maneuvering of such vehicles.

BRIEF SUMMARY

Aspects of the disclosure are directed to a system. The system may include a dome, a wiper assembly, a position sensor, and a control device. The wiper assembly includes a wiper blade that is configured to rotate around the dome. The position sensor may be configured to send a signal to a control device when a wiper blade passes the position sensor. The control device includes one or more processors that are configured to receive the signal from the position sensor; and determine a location of the wiper blade relative to the dome based on the received signal.

In one example of this aspect, the position sensor is a hall sensor that can detect the presence of a magnet coupled to the wiper assembly. In another example, the wiper blade rotates 360 degrees around the dome. In another example, the dome houses at least one of a camera and laser scanning equipment. In another example, a plurality of spray nozzles are arranged around a circumference of the dome. The one or more processors may be further configured to determine when the wiper blade will be at a predetermined position relative to the dome; and cause fluid to dispense through each of the spray nozzles when the wiper blade is at the predetermined position relative to the dome. Alternatively, the one or more processors may be further configured to determine a speed of rotation around the dome of the wiper blade; and use the speed of rotation to determine the location of the wiper blade.

In another example of this aspect, the control system may further instruct a fluid dispensing assembly to dispense a fluid onto the surface of the dome based upon the position of the at least one wiper blade. In another example, a drive motor is coupled to the wiper assembly. The drive motor can further include at least one additional position sensor. The one or more processors may be further configured to receive a second signal from the at least one additional position sensor indicating a position of the motor relative to the wiper blade; and determine the location of the wiper blade relative to the dome based on both the received signal and the second signal.

Other aspects of the disclosure are directed to a computer implemented method. The method includes determining the position of a wiper blade as the wiper blade rotates around a base of a dome, the method comprising: receiving, by one or more processors, a signal from a position sensor indicating detection of the wiper blade at a first position relative to the dome; accessing information, by the one or more processors, about a speed of the wiper blade as the wiper blade rotates around the base of the dome; and determining, by the one or more processors, a second position of the wiper blade relative to the dome based upon the speed.

In one example, the signal is a first signal and the method further includes receiving, by the one or more processors, a second signal from a second position sensor indicating a position of a drive motor relative to the wiper blade; and determining, by the control system, the second position of the wiper blade based upon the second signal and the speed of the wiper blade. In another example, the method further includes accessing information, by the one or more processors, about a position of a spray nozzle relative to the dome; accessing information, by the one or more processors, about a pre-determined position of the wiper blade relative to the spray nozzle; and determining, by the one or more processors, when the wiper blade is at the predetermined position based upon the position of the spray nozzle relative to a current position of the wiper blade.

In another example of this aspect, the one or more processors control the speed of the wiper blade. In another example, the method further includes activating, by the one or more processors, a fluid dispensing system, including a spray nozzle; and causing, by the one or more processors, fluid to be dispensed through the spray nozzle when the wiper blade is at the pre-determined position. Alternatively, the spray nozzle is a plurality of spray nozzles, including a first spray nozzle and a second spray nozzle. The method further includes accessing information about a first pre-determined position of the wiper blade relative to the first spray nozzle and a second pre-determined position of the wiper blade relative to the second spray nozzle; causing, by the one or more processors, the wiper fluid to be dispensed through the first spray nozzle when the wiper blade is at the first pre-determined position; and causing, by the one or more processors, the wiper fluid to be dispensed through the second spray nozzle when the wiper blade is at the second pre-determined position.

Additional aspects of the disclosure are directed to a computer implemented method. The method controls movement of a wiper blade assembly that is configured to move 360 degrees about a dome surface. The method includes receiving, by one or more processors, a signal indicating that optical deterrents are present on the dome surface; and causing, by the one or more processors, the wiper blade assembly to move in a first direction around the dome surface so as to deploy the wiper blade.

In one example, the method further includes causing, by the one or more processors, the wiper blade assembly to move in a second direction opposite the first direction so as to stow the wiper. Alternatively, the first direction is a clockwise direction and the second direction is a counter-clockwise direction. In another example, the method further includes adjusting, by the control system, a speed that the wiper blade assembly rotates about the dome surface. In another example, the signal is a first signal and the method further includes receiving, by the one or more processors, a second signal indicating that optical deterrents are cleared from the dome surface; and causing, by the one or more processors, the rotating assembly to move in a second direction opposite the first direction. In another example, the step of activating further includes rotating the drive motor in a third direction that is the same as the first direction.

Additional aspects of the disclosure provide a wiper system for clearing a surface of a dome. The system includes a plurality of wiper blades that are configured to move around a circumference of the dome, such that rotation of the wiper blades in a first direction around the circumference of the dome deploys the wiper blades into an actuated position. Rotation of the wiper blades in a second direction opposite the first direction stows the wiper blades into a collapsed position.

In one example of this aspect, the system further includes one or more spray nozzles adjacent a base of the dome. The spray nozzles are configured to emit wiper fluid on the dome. In another example, the first direction the wiper blades rotate is a clockwise direction and the second direction is a counter-clockwise direction.

In another example, the system further includes a bearing ring that extends around the circumference of the dome and that is fixed relative to the dome. A top plate may be configured to rotate about the bearing ring and the plurality of wiper blades may be coupled to the top plate. Alternatively, the bearing ring can further include a pivotable ramp and the wiper blades may be configured to move along a top surface of the pivotable ramp when the wiper blades rotate in the first direction. When the wiper blades rotate in the second direction, the wiper blades are configured to move along a bottom surface of the pivotable ramp. In another example, the bearing ring may also further include a recess. In another example, at least a portion of the pivotable ramp may be positioned within the recess and at least a portion of the top surface of the pivotable ramp may be positioned outside of the recess.

In yet another example, the bearing ring may further include a top surface and a bottom surface. The top surface of the ramp includes a first slope that extends away from the top surface of the bearing ring. The bottom surface of the ramp includes a second slope that extends away from the top surface of the bearing ring. The second slope may be greater than the first slope. In another example, the wiper blades are configured to extend across a top surface of the top plate when the wiper blades are in the collapsed position. A length of the wiper blade may extend along a height of the dome when the wiper blades are in the actuated position.

In accordance with another aspect of the present disclosure, a system for clearing a 360 degree curved surface is disclosed. The system includes a rotating assembly extending around a base of the 360 degree curved surface and at least one wiper blade assembly. The at least one wiper blade assembly includes a wiper blade that has a blade base coupled to the rotating assembly. The rotating assembly may be configured to move the at least one wiper blade assembly around the base of the curved surface while the wiper blade extends away from the rotating assembly and along a sidewall of the 360 degree curved surface.

In another example of this aspect, the 360 degree surface includes a dome-shape. In another example of this aspect, the base of the wiper blade may further move around an outer perimeter of the curved surface. The wiper blade may also move between an actuated position and a stowed position. The actuated position is at a first angle relative to the rotating assembly and the second position is at a second angle relative to the rotating assembly, the first angle being greater than the second angle. In another example, the system further includes a drive motor, and the rotating assembly further includes a top plate and a ring gear coupled to the drive motor. The drive motor may be configured to move the ring gear and the top plate about the base. The wiper blade assembly can further include a base mount attached to the top plate and the wiper blade may be coupled to the base mount. In another example of this aspect, the rotating assembly is configured to move the base mount 360 degrees around the base of the curved surface. The system may further include a vehicle and the curved surface may be positioned on an exterior portion of the vehicle.

In accordance with another aspect of the present disclosure, a method of clearing a 360 degree surface includes rotating a wiper blade assembly in a first direction around the 360 degree surface; moving a wiper blade assembly along a first ramped surface from a lowered position to an upright position; and rotating the wiper blade assembly around the 360 degree surface while the wiper blade is in the upright position.

In another example, the method further includes rotating the wiper blade assembly in a second direction along a second ramped surface to move the wiper blade assembly from the upright position to the lowered position. In another example, the method further includes spraying wiper fluid on the 360 degree surface while the rotating wiper blade assembly moves in the first direction.

BRIEF DESCRIPTION OF THE DRAWINGS

FIG. 1 is a perspective view of an example wiper assembly positioned on a vehicle according to aspects of the disclosure.

FIG. 2 is an enlarged portion of FIG. 1.

FIG. 3 is a side plan view of an example pivoting connector of the example wiper assembly according to aspects of the disclosure.

FIG. 5 is a perspective view of a rotating assembly according to aspects of the disclosure.

FIG. 6 is a perspective view of a ramp of the rotating assembly according to aspects of the disclosure.

FIG. 7 is a side plan view of the component of FIG. 6.

FIG. 8 is an enlarged view of a portion of FIG. 4.

FIG. 9 is a perspective view of the wiper assembly in an actuated position according to aspects of the disclosure.

FIG. 10 is an example external view of a vehicle according to aspects of the disclosure.

FIG. 12 is an example flow diagram in accordance with aspects of the disclosure.

FIG. 13 is another example flow diagram in accordance with aspects of the disclosure.

FIG. 14 is a further example flow diagram in accordance with aspects of the disclosure.

DETAILED DESCRIPTION

Figure 4:
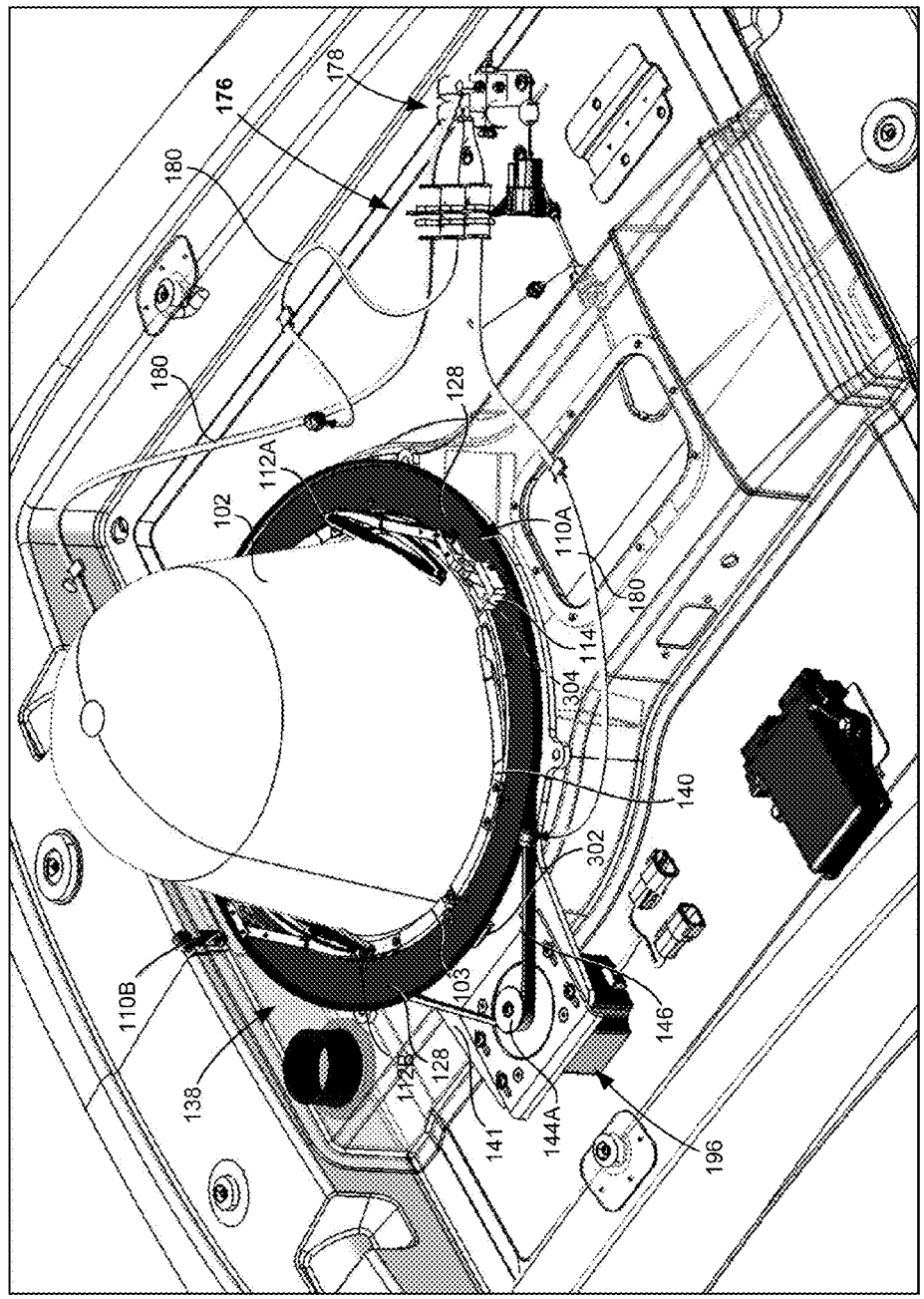
FIG. 4 is a perspective view of the example wiper assembly with portions of the vehicle removed to expose additional components of the wiper assembly according to aspects of the disclosure.

The present disclosure is directed to a passive wiper system capable of cleaning a surface in the shape of a dome that is positioned on a vehicle. The dome may be used to house cameras and laser scanning equipment that communicate with other systems in the vehicle. As noted above, the accumulation of optical deterrents, such as dust, dirt, and debris, found on the surface of the dome can occlude cameras and attenuate the laser scanning equipment. To address this, a wiper system can continuously clear optical deterrents. The wiper system may passively deploy itself when optical deterrents are detected on the dome outer surface and passively stow itself when the surface of the dome is determined to be sufficiently cleared. In addition, cleaning and/or lubrication fluid can also be automatically sprayed by the example wiper system onto the surface of the dome to assist with the removal process. In this regard, a control system that communicates with the wiper system can detect wiper position, control wiper speed, solenoid timing, and pump actuation for emission of the fluid.

The wiper system may include a rotating assembly arranged around the dome that includes wiper blade assemblies driven by a drive motor. For example, the rotating assembly may include a bearing ring, as well as a ring gear joined to a top plate. The ring gear and top plate can rotate a full 360° on a series of cam bearings about the bearing ring and dome surface. The rotating assembly can be attached to the drive motor via a fiber reinforced rubber timing belt. In one example, a rubber timing belt is attached to the ring gear so that movement of the drive motor causes movement of both the ring gear and the top plate. Wiper blades of the wiper blade assemblies may be positioned on the top plate and moved about the dome as the top plate rotates about the dome. A movable ramp on the bearing ring can both deploy the wiper blades into an upright position, as well as stow the wiper blades into a collapsed position.

Equally spaced wiper blade assemblies are positioned at opposed sides of the dome. Each wiper blade assembly can include a wiper blade coupled to a base mount. A pivoting connector joins the wiper blades to the base mount. In one example, one end of the pivoting connector is pivotably attached to the base mount and a second end of the pivoting connector is attached to the wiper blade.

As noted above, the wiper blades may move between a stowed position and an actuated position. In the stowed position, the wiper blades may be positioned adjacent the base of the dome and extend in a generally horizontal direction across the top plate. The wiper system can deploy the wiper blades into the actuated position when the top plate is rotated in a first direction relative to the bearing ring and stow the blades when the top plate rotates in opposite second direction opposite of the first direction. In the actuated position, the blades may be capable of moving around the dome and can remain in the actuated position as the blades rotate about the dome.

The wiper system may also include a fluid dispensing system. The fluid dispensing system may operate in tandem with the wiper assemblies to clear optical deterrents from the surface of the dome. For example, sprays of cleaning and/or lubricating fluid can be automatically dispensed from the nozzles as the wiper blades spin around the dome. In one example, the sprays can be timed to emit fluid each time the wiper blade passes a spray nozzle.

The wiper system may also include a control system that tracks the position of the wiper blades and transmits this information to the vehicle, triggers the emission of wiper fluid, and cause actuation or deployment of the wiper blades when optical deterrents are present on the dome. The control system may include one or more processors which process information in order to control aspects of the wiper system as discussed below.

I. Structure of the Wiper System

As noted above, an example wiper system may include wiper blade assemblies positioned around a dome that is positioned on the roof of a vehicle. A rotating assembly moves wiper blades of the wiper blade assemblies between a stowed position and an actuated position. In the stowed position, the wiper blades may be positioned adjacent the base of the dome and extend in a generally horizontal direction across the base of the dome. In the actuated position, the wiper blades may be positioned in a generally vertically direction relative to the base of the dome. The wiper blades can be deployed into the actuated position when the wiper blade assemblies are rotated in a first direction around the dome and stow the blades when the wiper blade assemblies are rotated in a second direction opposite the first direction.

An example wiper system 100 is shown in FIG. 1. Wiper system 100 may be used to clear optical deterrents that may appear on a surface 106 of a dome 102 positioned adjacent the top or roof 104 of a vehicle assembly. Dome 102 may include a planar bottom surface and may be comprised of a transparent material or an opaque material. Similarly, the dome itself may be comprised of any desired material and further coated with another material that ranges between being opaque and transparent. Cameras, laser scanning equipment, and the like may be housed within dome 102 to obtain information about the absolute or relative position of the vehicle assembly on a map or on the earth, as well as the location of objects external to the vehicle, such as other vehicles, obstacles in the roadway, traffic signals, trees, etc.

The wiper system may include one or more wiper blade assemblies positioned around the dome. As shown in FIG. 1, two equally spaced wiper blade assemblies 110A,110B are positioned at opposed sides of dome 102. An enlarged view of wiper blade assembly 110A (which may be the same or substantially similar to wiper blade assembly 110B) is shown in FIG. 2. Wiper blade assembly 110A includes a first wiper blade 112A coupled to base mount 114.

The first wiper blade 112A includes an intermediate wiper arm 116 that is pivotably coupled to a pivoting connector 118. Pivoting connector 118 has a first end 120 joined to intermediate wiper arm 116 and a second end 122 pivotably connected to base mount 114. For ease of discussion, reference will only be made to wiper blade assembly 110A, but it is to be understood that the discussion of wiper blade assembly 110A is equally applicable to wiper blade assembly 110B, which includes a second wiper blade 112B.

A base mount 114 of wiper blade assembly 110A forms the base of wiper blade assembly 110A and secures the components of wiper blade assembly 110A to the vehicle assembly. In the example of FIG. 2, base mount 114 is u-shaped and attached to top plate 128. Base mount 114 supports the remainder of the components of wiper blade assembly 110A, including pivoting connector 118 and first wiper blade 112A. Pivoting connector 118 is secured to base mount 114 by a screw or pin 130 that extends through both base mount 114 and pivoting connector 118.

Pivoting connector 118 of wiper blade assembly 110A is shown in greater detail in FIG. 3. In this example, first end 120 of pivoting connector 118 includes first and second arm extensions 124,126 that are spaced apart from one another. The height H1 between first and second arm extensions 124,126 should be sufficiently large enough to receive the intermediate arm of the wiper blade. Openings 132,134 extend through first and second arm extensions 124,126. A pin or screw 136 (FIG. 2) can extend through openings 132,134, as well as the intermediate arm of first wiper blade 112A to secure first wiper blade 112A to pivoting connector 118, which in turn secures the intermediate arm and first wiper blade 112A to base mount 114.

First and second wiper blades 112A,112B may be provided on the wiper blade assembly to physically clear optical deterrents from the dome surface. For example, the first and second wiper blades 112A,112B may be comprised of flexible rubber or plastic and be configured to apply sufficient amount of pressure to surface 106 of dome 102 to clear optical deterrents from the surface 106. Spring 107 (FIG. 2) on pivoting connector 118 may be used to provide the force necessary to keep first and second wiper blades 112A,112B positioned adjacent the dome surface.

The wiper system may further include a rotating assembly to move the wiper blade assemblies about the dome. An example rotating assembly 138 is shown in FIG. 4. FIG. 4 is a view of the top of a vehicle with portions of the roof of the vehicle removed. Rotating assembly 138 is positioned around the periphery of base 103 of dome 102. Rotating assembly 138 may include a bearing ring 140 attached to base plate 141, as well as a ring gear (not shown) joined to top plate 128. Wiper blade assemblies 110A,110B are mounted to top plate 128 and move with top plate 128 about dome 102. Bearing ring 140 and base plate 141 may provide a base or foundation for rotating assembly 138.

Bearing ring 140 may be positioned about dome 102. For example, bearing ring 140 may be a fixed ring positioned directly adjacent dome 102. Turning to FIG. 5, which is a view of rotating assembly 138 with wiper blade assemblies 110A,110B thereon, bearing ring 140 is depicted as a circular ring. The bearing ring 140 may be comprised of a rigid metal, such as aluminum, steel, alloy, or the like, or a plastic material, such as a polymer, or the like. Bearing ring 140 includes top surface 142 and bottom surface 144. As shown, cam bearings 146, recesses 148, and ramps 150 are positioned around the circumference of bearing ring 140.

In the example of FIG. 5, three recesses 148 are equally spaced around the circumference of bearing ring 140. Each recess 148 is tiered such that a first surface 152 of recess 148 is closer to a top surface 142 of bearing ring 140 and second surface 154 of recess 148 is closer to bottom surface 144 of bearing ring 140.

Ramps 150 may be secured to bearing ring 140. In one example, three identical ramps 150 are pivotally attached to bearing ring 140 by a screw or pin 155 or the like. FIG. 6 includes a detailed view of an example ramp 150. Ramp 150 is an elongated member that includes a sloped top surface 156. Sloped top surface 156 has a positive incline that gradually increases from front edge 162 of ramp 150 in a direction toward rear edge 164 of ramp 150.

The bottom surface of ramp 150 is divided into two primary sections by pivot point P, the point at which ramp 150 is attached to bearing ring 140: front bottom surface 158 and rear bottom surface 160. Front bottom surface 158 includes the surface extending between front edge 162 and intermediate rear edge 182 formed by pivot point P. Front bottom surface 158 is positioned toward front edge 162 of ramp 150 and underlies sloped top surface 156. Front bottom surface 158 is generally planar. Rear bottom surface 160 is positioned toward the rear of ramp 150. Rear bottom surface 160 includes the surface extending between pivot point P and rear edge 164 of ramp 150. Rear bottom surface 160 has a negative incline from rear edge 164 to pivot point P.

The sloped top surfaces 156 of ramps 150 need not extend all the way to rear edge 164. For example, a portion of sloped top surface 156 does not extend all the way to rear edge 164 and instead terminates at point 186. An intermediate rear edge 182 is formed at point 186. Intermediate rear edge 182 is spaced away from rear edge 164 such that sloped top surface 156 includes a width W1 that is wider than a width W2 at rear edge 164. An intermediate edge surface 188 is also formed on the surface opposite sloped top surface 156. With reference now to FIG. 7, intermediate edge surface 188 extends from intermediate rear edge 182 to a point 190 along rear bottom surface 160. In this example, intermediate edge surface 188 has an angle $\varphi 1$ relative to rear bottom surface 160 that is greater than an angle $\varphi 2$ relative to rear bottom surface 160.

Ramps 150 are positioned within recesses 148. For example, with reference back to FIG. 5, ramps 150 may be pivotally attached to bearing ring 140 and movable within each of the respective recesses 148. As shown, rear bottom surface 160 of ramps 150 can be positioned entirely within recess 148. The portion of rear bottom surface 160 positioned near rear edge 164 is adjacent first surface 152 of recess 148 and the portion of rear bottom surface 160 positioned closer to pivot point P is adjacent second surface 154 of recess 148. When ramps 150 are pivoted forward, each front edge 162 and front bottom surface 158 of ramps 150 are adjacent top surface 142 of bearing ring 140. In this position, rear edges 164 of ramps 150 extend slightly above top surface 142 of bearing ring 140.

Rotating assembly 138 may further include a ring gear 192 and an overlying top plate 128. As shown in FIG. 5, ring gear 192 is a round structure that is positioned adjacent bearing ring 140. Ring gear 192 includes an interior opening that is large enough to receive both bearing ring 140 and the dome (not shown). Ring gear 192 includes teeth 194 that extend around the circumference of ring gear 192. Top plate 128 overlies ring gear 192 and is positioned adjacent bearing ring 140. In this example, ramps 150 and top surface 142 of bearing ring 140 extend above top surface 129 of top plate 128. Top plate 128 also includes a lip 131 that extends downward and away from top surface 129 of top plate 128.

Top plate 128 and ring gear 192 can rotate 360° about bearing ring 140 and dome 102. In one example, a drive motor 196 may be used to rotate ring gear 192 and attached top plate 128 360° on a series of cam bearings 146 positioned around bearing ring 140. As shown in FIG. 8, axle 144A of drive motor 196 is coupled to ring gear 192 via a timing belt 198, such as a fiber reinforced rubber timing belt. Movement or rotation of axle 144A causes movement of both ring gear 192 and top plate 128 about dome 102 and bearing ring 140. This movement also causes movement of wiper blade assemblies 110A,110B, which are coupled to top plate 128.

As noted above, first and second wiper blades 112A,112B may move between a stowed position and an actuated position. In the stowed position, wiper blades 112A,112B may be positioned adjacent base 103 of dome 102 and extend in a generally horizontal direction across top plate 128. Wiper blades 112A,112B can be moved to an actuated position where the wiper blades 112A,112B are positioned in a more upright position, such as shown in FIG. 9. In the upright position, first wiper blade 112A and second wiper blade 112B (not shown in FIG. 9) can be positioned at an angle $\varphi 3$ relative to top plate 129, such as 90°. In other examples, $\varphi 3$ may range anywhere from 5°-90°. In this example, a central axis A extends through dome 102 and in a direction perpendicular to the planar bottom surface (not shown) of dome 102 and vehicle surface. In the actuated position, wiper blade assembly 110A,110B are capable of moving 360° around base 103 of dome 102 and central axis A. In this embodiment, first and second wiper blades 112A, 112B can remain in the actuated position as first and second wiper blades 112A,112B rotate about the dome 102. Friction between wiper blades 112A,112B and outer surface 106 of dome 102 keeps the wiper blades in an actuated position until it is desired to stow wiper blades 112A,112B. It is to be appreciated that the continuous movement of the first and second wiper blades 112A,112B in the actuated position around the dome differs from the movement of conventional wiper blades assemblies. To clear surfaces, such conventional wiper blade assemblies include wiper blades that move in continuous arc-like paths between a lowered position and an upright position.

Wiper system 100 can deploy wiper blades 112A,112B into the actuated position when top plate 128 is rotated in a first direction relative to the bearing ring 140. For example, when top plate 128 of wiper system 100 is moved in a counterclockwise direction by drive motor 196 relative to bearing ring 140, wiper blades 112A,112B can be moved from the stowed position to the actuated position.

Referring to FIG. 5, posts, such as post 172, extend from each wiper blade assembly 110A,110B and allow the wiper blades to move into the actuated position. In this view, post 172 of wiper blade assembly 110B is visible and shown extending from wiper blade assembly 110B. Post 172 may be attached to pivoting connector 118. When top plate 128 is moved relative to bearing ring 140, post 172 contacts the sloped top surface 156 of ramp 150 positioned on bearing ring 140. As post 172 passes over the rise of sloped top surface 156, post 172 and pivoting connector 118 are pushed upward so that wiper blades 112A,112B are moved into the actuated or upright position. Referring to wiper blade assembly 110B, pivoting connector 118 rotates about pin 130 so that pivoting connector 118 can be moved into an upright position. In this example, tab 119 on pivoting connector 118 can contact top surface 115 of base mount 114 in order to help keep wiper blades 112A,112B in an upright position and to prevent pivoting connector 118 from over rotating.

The posts, such as post 172, may also allow the wiper blades to move into the stowed position. For example, the wiper system may stow first and second wiper blades 112A,112B when top plate 128 rotates in a direction opposite the direction required to move first and second wiper blades 112A,112B into the actuated position. For example, rotation of wiper blade assemblies 110A,110B in the clockwise direction moves post 172 into contact with intermediate lower surface 188 of ramp 150. This movement causes ramp 150 to pivot slightly forward to expose at least a portion of rear bottom surface 160 of ramp 150. Further movement of top plate 128 in a clockwise direction causes post 172 to travel along the decreasing slope of intermediate edge surface 188. Post 172 is then pushed downward, causing the wiper blades 112A,112B to be lowered into the stowed position.

II. Fluid Dispensing System

Wiper system 100 may communicate with a fluid dispensing system. For example, with reference back to FIGS. 1 and 4, a fluid dispensing system 174 (shown in FIG. 4) may include spray nozzles 108A,108B,108C. The spray nozzles may be positioned around dome 102 to spray wiper fluid, such as cleaning and/or lubricating fluid, onto surface 106 of the dome 102. In this regard, the fluid dispensing system can automatically dispense wiper fluids through spray nozzles 108A,108B,108C as wiper blades 112A,112B spin around the dome 102.

In one example, fluid dispensing system 174 includes a fluid reservoir (not shown), solenoid valves 176, a pump 178, and separate fluid lines 180 connected to three nozzles 108A,108B,108C. Nozzles 108A,108B,108C spray surface 106 of dome 102 with wiper fluid, such as cleaning/lubricant fluid. As shown, each fluid line 180 feeds into respective nozzles 108A,108B,108C. Nozzles 108,108B,108C may be equally spaced around dome 102, such that the three nozzles 108A,108B,108C are spaced approximately 120° away from one another relative to dome 102.

Wiper system 100 can be used with any type of vehicle assembly. While certain aspects of the disclosure are particularly useful in connection with specific types of vehicles, the vehicle assembly may be any type of vehicle assembly including, but not limited to, cars, trucks, motorcycles, busses, recreational vehicles, etc. Turning now to FIG. 10, there is shown an example vehicle assembly 200 onto which wiper system 100 is positioned. As can be seen, vehicle assembly 200 includes many features of a typical vehicle such as headlights 202, windshield 203, taillights/turn signal lights, rear windshield 204, doors 206, side view mirrors 208, tires and wheels 210, and turn signal/parking lights 212. In this example, vehicle assembly 200 is an autonomous vehicle, such as a vehicle that does not require a human driver and can be used to aid in the transport of passengers or items from one location to another. Such vehicle may operate in a fully autonomous mode where passengers may provide some initial input, such as a destination, and the vehicle maneuvers itself to that destination. In other examples, vehicle assembly 200 may require a human driver.

Vehicle assembly 200 also includes housing 214, which may be in the shape of a dome. Housing 214 may include a planar bottom surface that is positioned on top of vehicle assembly 200. One or more laser devices having 360° or narrower fields of view and/or one or more camera devices may be positioned within dome 102. In addition or alternatively, housing 214 may include, for example, one or more radar and/or sonar devices. Each of the radar, camera, and laser devices may be associated with processing components which process data from these devices and provide sensor data to other systems in vehicle assembly 200, including the control system, which will be discussed in more detail herein. Examples of such data may include whether portions of the housing 214 is occluded.

III. Control System for Wiper System & Fluid Dispensing System

The wiper system may also include a control system that controls actuation or deployment of the wiper blades; tracks the position of the wiper blades and transmits this information to the vehicle, triggers the emission of wiper fluid. The control system may include one or more processors which process information in order to control aspects of the wiper system as discussed below.

Figure 11:
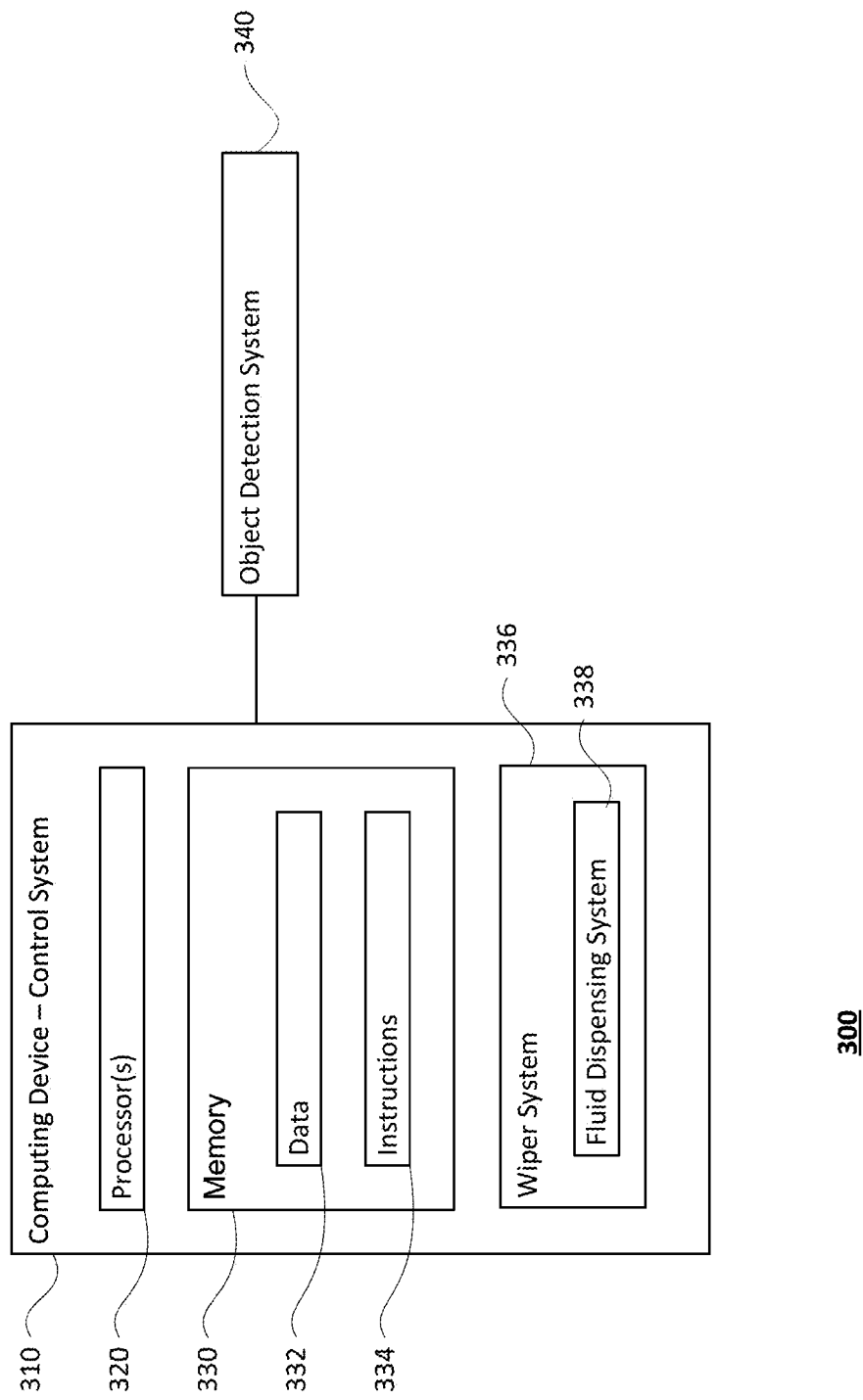
FIG. 11 is an example control system of a vehicle according to aspects of the disclosure.

FIG. 11 illustrates an example 300 of a computing device or control system for a vehicle assembly in which the features described above may be implemented. The computing device may contain one or more processors, memory, and other components generally found in general purpose computing devices.

As shown in FIG. 11, a vehicle assembly 300 in accordance with one aspect of the disclosure may have one or more computing devices, such as vehicle computing device 310 containing one or more processors 320, memory 330 and other components typically present in general purpose computing devices.

The memory 330 stores information accessible by the one or more processors 320, including data 332 and instructions 235 that may be executed or otherwise used by the processor 320. The memory 330 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 334 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 332 may be retrieved, stored or modified by processor 320 in accordance with the instructions 334. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 320 may be any conventional processors, such as commercially available CPUs. Alternatively, the one or more processors may be a dedicated device such as an ASIC or other hardware-based processor. Although FIG. 11 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 310. Accordingly, references to a processor or computing device will be understood to include references to a collection of processors or computing devices or memories that may or may not operate in parallel.

In one example, computing device 310 may be a control system incorporated into vehicle assembly 200. The control system may be capable of communicating with various components of the vehicle. For example, computing device 210 may be in communication with various systems of vehicle assembly 200, such as wiper system 336 that controls movement of a passive wiper system on the vehicle assembly 200, fluid dispensing system 338, and object detection system 340.

Control system 310 may receive signals from other systems in the vehicle assembly indicating that the wiper system 336 should be deployed. In such example, control system 310 may activate the drive motor and cause the drive motor to begin rotating so that the wiper blades assemblies 110A,110B also begin to rotate around dome 102. Control system 310 may also receive signals indicating the position of wiper blades of the wiper system and provide signals to other systems, such as fluid dispensing system to dispense fluid through spray nozzles positioned around the dome. Again, although the wiper system 336 is shown as part of computing device 310, in actuality, wiper system 336 may be a separate system in communication with control system 310.

Control system 310 can deploy the wiper blades of wiper system 336 when optical deterrents are present on the dome. For example, when rain, debris or the like are on the dome surface of the vehicle assembly and occlude the cameras or lasers positioned within the dome, control system 310 may receive a message or signal that the dome is occluded. The message may be transmitted from another system within the vehicle assembly that detects the presence of optical deterrents on the dome, such as an object detection system 340. The object detection system can include its own memory, data, instructions, and processors. In one example, object detection system 340 may include cameras (not shown) inside the dome. These cameras may be the same cameras that are used to gather information to maneuver the vehicle assembly or cameras dedicated to determining whether occlusions are present on the dome. The processors of the object detection system can conduct complex post processing using digital filters and logic on the received images to evaluate the quality of the received image and determine if occlusions are present on the dome.

With reference back to FIG. 4, when control system 310 receives a message from the object detection system 340 that the dome surface is occluded, control system 310 can activate drive motor 196 and cause wiper blade assemblies 110A,110B to deploy. For example, control system 310 can activate drive motor 196 and cause drive motor 196 to rotate in the first direction so that the ring gear, top plate 128, and wiper blade assemblies 110A,110B also rotate in a first direction, such as the counterclockwise direction. Rotation of wiper blade assemblies 110A,110B in the first direction can deploy wiper blade assemblies 110A,110B so that first and second that wiper blades 112A,112B are moved into an upright position as previously discussed herein.

Conversely, when the control system 310 receives a message from the object detection system 340 that the optical deterrents are sufficiently cleared from the dome surface or no longer present on the dome surface, control system 200 can deactivate drive motor 196 and cause drive motor 196 to rotate in the opposite direction, so that ring gear 192, top plate 128, and wiper blade assemblies 110A, 110B rotate in the opposite direction, such as clockwise, to stow first and second wiper blades 112A,112B. Drive motor 196 can stop rotating when first and second wiper blades 112A,112B are stowed.

The position of at least one of the first and second wiper blades 112A,112B can be determined by the control system. For example, once the wiper blades assemblies 110A,110B are deployed, one or more position sensors within the control system can be used to determine the presence and position of one or more of the wiper blade.

For instance, referring to both FIGS. 4 and 8, a position sensor 302 may be a hall sensor that is fixed relative to the ring gear and top plate 128. In this example, position sensor 302 is fixed to base plate 141 and is positioned between axle 144A of drive motor 196 and ring gear 192. Position sensor 302 can detect the magnetic fields of one or more magnets positioned on a portion of the rotating assembly 138 that moves about dome 102.

Magnet 304 may be positioned adjacent one or more of the wiper blade assemblies 110A,110B that rotate about the dome. Magnet 304 may be positioned, for example, adjacent base mount 114 of first wiper blade assembly 110A. In this regard, each time magnet 304 passes in front of position sensor 302, position sensor 302 detects the presence of magnet 304.

Position sensor 302 may communicate with control system 310 to indicate detection of one or more wiper blades. For example, each time magnet 304 passes in front of position sensor 302, position sensor 302 can send a signal to control system 310 indicating that magnet 304 has been detected. In this example, because magnet 304 is adjacent base mount 114 of wiper blade assembly 110A, detection of magnet 304 also indicates detection of first wiper blade 112A. Furthermore, detection of magnet 304 may also indicate to the control system 310 that wiper blade 112A has made a complete revolution about dome 102.

Control system 310 can calculate the position of the first and/or second wiper blades 112A,112B each time control system 210 receives a signal from position sensor 302 by accessing information about the position of position sensor 202 relative to the dome. For example, because the position of the position sensor 302 is fixed, control system 310 can readily determine the position of the first and second wiper blades 112. In one example where magnet 302 is positioned adjacent base mount 114 of first wiper blade 112A, when first wiper blade assembly 110A is positioned directly in front of position sensor 302 or at 0°, the second wiper blade 112B will be positioned 180° away from the first wiper blade.

Control system 310 may also calculate the position of the first and/or second wiper blades 112A,112B, as first wiper blade 112A makes a complete revolution and returns back to position sensor 302. For example, control system 310 can access information about the speed of the rotating assembly. Based upon the determined speed, control system 310 can determine how far first and second wiper blades 112A,112B will advance within a given time period. For example, first wiper blade 112A may make one revolution every nine seconds. In this example, the first wiper blade 112A would travel 120° every three seconds, and that first wiper blade 112A travels 40° every second. In other examples, first wiper blade 112A may make one revolution at a time greater than or less than nine seconds. For example, wiper blade 112A may make one complete revolution every second. The system can easily calculate the position of the first wiper blade 112A at any given point during a revolution based upon a given speed. Control system 310 may also control speed and make adjustments for speed.

The position of second wiper blade 112B can be similarly determined. For example, the position of wiper blade 112B is fixed 180° away from first wiper blade 112A. Once the position of first wiper blade 112A is determined, control system 310 can calculate the position of second wiper blade 112B by adding 180° to the current position of first wiper blade 112A. In other examples, a second position sensor can be provided adjacent base mount 114 of second wiper 112B. Based on the signal of the second position sensor, control system 302 can calculate the position of second wiper blade 112B in the same way the position of first wiper blade 112A is calculated.

To provide for even greater accuracy of the position of wiper blades 112 or as an alternative way to determine the position of first and second wiper blades 112A,112B, one or more position sensors may be positioned within drive motor 196. For example, there may be three hall sensors (not shown) positioned within drive motor 196 to detect the position of drive motor 196 at any given time. The hall sensors can transmit information to control system 210 indicating detection of the magnets in the drive motion 196 and the position of the gears within motor 196 at a given time.

When the position of drive motor 196 is obtained from the hall sensors, a more accurate calculation of the position of wiper blades 112 can be made. For example, as discussed above, control system 310 can predict the expected position of first wiper blade 112A at points during revolution about the dome. However, the speed of rotating assembly may change during a revolution or may fluctuate, which would affect the predicted position of wiper blades 112A,112B. Knowledge of the exact position of drive motor 196 can provide additional information to control system 310 that will allow for a more accurate determination of the position of either or both first and second wiper blades 112A,112B at any point in time.

Control system 310 may also access information about the position of spray nozzles 108A,108B,108C. Referring again to FIG. 4, as discussed in the example above, three spray nozzles 108A, 108B, and 108C may be equally spaced apart by 120° relative to the dome. In such example, where 0° is at the fixed position of position sensor 302, the position of each of the spray nozzles 108A, 108B, and 108C relative to position sensor 302 is known. For example, as shown, the first spray nozzle 108A may be positioned at 60°; the second spray nozzle 108B can be positioned at 180° away from position sensor 302 in a clockwise direction (or 120° away from the first nozzle 108A); and, third spray nozzle 108C may be positioned at approximately 300° away from position sensor 202 in a clockwise direction. With access to these positions, control system 310 can accurately dispense fluids based upon a determined position of the first wiper blade 112A and/or second wiper blade 112B.

Control system 310 can access information identifying an optimum position of the wiper blades relative to the spray nozzles 110A,110B,110C for activating the fluid dispensing system 174. For example, the optimum position may be one where the wiper fluid is dispensed just before wiper blade 112A passes in front of each spray nozzle 110A,110B,110C. This would allow the dome surface 106 to be sprayed with fluid, but immediately cleared by first wiper blade 112A to prevent excess fluid runoff. In one example, it may be pre-determined that the fluids should be triggered when first wiper blade 112A is at a fixed distance away from each spray nozzle, such as 5°-10° away from each spray nozzle 110A, 110B,110C as first wiper blade 112A move 360° relative to the dome. The optimum position of second wiper blade 112B can be similar to the optimum position of first wiper blade 112A, although it may instead differ.

Control system 310 can calculate when one or more wiper blades will be at the optimum position. As previously discussed, control system 310 may be capable of determining the exact position of first wiper blade 112A, as well as the second wiper blade 112B each time magnet 302 makes a complete revolution. In the example where it is determined that the spray nozzles should spray fluid when the first wiper blade 112 is positioned 10° away from the respective first, second and third spray nozzles 110A,110B,110C, control system 310 can determine when first wiper blade 112A will be positioned at 50°, 110° and 290°, with 0° being at the position of the position sensor 302. As discussed above, in one example, control system 310 can make the determination based upon the speed and expected position of wiper blade 310.

Control system 310 may send a signal to fluid dispensing system 310 to pump fluid into fluid lines 180 such that each of the nozzles 110A,110B,110C will spray wiper fluid when first wiper blade 112A is at the optimum position. For example, at the time the wiper blade is at the optimum positions of 50°, 110° and 290°, fluid dispensing system 174 will dispense fluid through the respective spray nozzles. Thus, the spray nozzles 110A,110B,110C can be sequentially triggered by the control system as first wiper blade 112A rotates about the dome. Fluid dispensing system 174 can also be activated each time the second wiper blade 112B is at the optimum position.

FIG. 12 is an example flow diagram 400 in accordance with some of the aspects described above that may be performed by one or more computing devices such as control system 310. In this example, control system 310 receives a signal at block 410. The signal indicates that optical deterrents are present on the surface of a vehicle assembly, such as the dome. At block 420, control system 310 may activate the drive motor and cause the drive motor to begin rotating in a first direction. Movement of the drive motor also causes the rotating assembly, which is coupled to the drive motor, and any wiper blade assemblies, which are coupled to the rotating assembly, to rotate in a first direction. Movement of rotating assembly will cause one or more wiper blade assemblies to also rotate in a first direction, so as to deploy the wiper blades into an upright position. When it is desired to stow the wiper blades, at block 430, control system 310 will deactivate the drive motor and cause the drive motor to rotate in a second direction that is opposite the first direction, thereby causing the rotating assembly and wiper blade assemblies to also rotate in a second direction that is opposite the first direction. This will also cause the wiper blades to be moved into the stowed position.

FIG. 13 is an example flow diagram 500 in accordance with some of the aspects described above that may be performed by one or more computing devices such as control system 310. At block 510, control system 310 receives a signal from the position sensor. The signal indicates the detection of a wiper blade at a first position relative to the dome and position sensor. Information about the speed of rotating assembly is accessed by control system 310 at block 520. Using the information about the speed of rotating assembly, at block 530, control system 310 can determine a second position of the wiper blades as the wiper blades make a 360 degree revolution around the dome.

FIG. 14 is an example flow diagram 600 in accordance with some of the aspects described above that may be performed by one or more computing devices such as control system 310. At block 610, control system 310 receives a signal from the position sensor. The signal indicates the detection of a wiper blade at a first position relative to the dome and position sensor. Control system 310 accesses information about the speed of rotating assembly at block 620. Information about the position of spray nozzles is accessed by control system 310 at block 630 and information about the optimum position of a wiper blade relative to a spray nozzle is accessed by control system 310 at block 640. For example, there may be three spray nozzles equally spaced around the dome. Control system 310 can also access information regarding how far away the wiper blade should be from each spray nozzle before the wiper fluid sprays fluid. Control system 310 can then determine when the wiper blade is at an optimum position relative to the spray nozzle and dome. For example, the optimum position may be one where the wiper blade is positioned 5-10 degrees away from the spray nozzle. At block 650, control system 310 will determine when the wiper blade is at the optimum position. Control system 310 can either predict that the wiper blade will be at an optimum position at a given time period based upon the speed. Alternatively, control system 310 can determine an exact location based upon various sensors in the system. Once control system 310 has determined that the wiper blade is at the optimum position, control system can activate the fluid dispensing system at block 660 and cause wiper fluid to be dispensed through the spray nozzle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of determining a position of a wiper blade as the wiper blade rotates around a dome, the method comprising:
   receiving, by one or more processors, a signal from a position sensor indicating detection of the wiper blade at a first position relative to the dome;
   accessing information, by the one or more processors, about a speed of the wiper blade as the wiper blade rotates around the base of the dome;
   determining, by the one or more processors, a second position of the wiper blade relative to the dome based upon the speed;
   based on the determined second position, causing, by the one or more processors, fluid to be dispensed through a spray nozzle when the wiper blade is at a pre-determined position.

2. The method of claim 1, wherein the signal is a first signal, the method further comprising:
   receiving, by the one or more processors, a second signal from a second position sensor indicating a position of a drive motor relative to the wiper blade; and
   determining, by the one or more processors, the second position of the wiper blade based upon the second signal and the speed of the wiper blade.

3. The method of claim 1 further comprising:
   accessing information, by the one or more processors, about a position of a spray nozzle relative to the dome;
   accessing information, by the one or more processors, about the pre-determined position of the wiper blade relative to the spray nozzle; and
   determining, by the one or more processors, when the wiper blade is at the pre-determined position based upon the position of the spray nozzle relative to a current position of the wiper blade.

4. The method of claim 1 further comprising activating, by the one or more processors, a fluid dispensing system, including the spray nozzle in order to cause the fluid to be dispensed through the spray nozzle.

5. The method of claim 1, wherein the spray nozzle is a plurality of spray nozzles, including a first spray nozzle and a second spray nozzle, and the method further comprises:
- accessing information about a first pre-determined position of the wiper blade relative to the first spray nozzle and a second pre-determined position of the wiper blade relative to the second spray nozzle;
- causing, by the one or more processors, fluid to be dispensed through the first spray nozzle when the wiper blade is at the first pre-determined position; and
- causing, by the one or more processors, fluid to be dispensed through the second spray nozzle when the wiper blade is at the second pre-determined position.

6. The method of claim 2, further comprising controlling, by the one or more processors, speed of the wiper blade.

7. A method of controlling movement of a wiper blade assembly configured to move 360 degrees about a dome surface, the wiper blade assembly including a wiper blade, the method comprising:
- receiving, by one or more processors, a signal indicating that optical deterrents are present on the dome surface;
- in response to receiving the signal, causing, by the one or more processors, the wiper blade assembly to move in a first direction around the dome surface by rotating a bearing ring to which the wiper blade is attached in a first direction around the dome surface and thereby moving the wiper blade from a stowed condition to a deployed condition of the wiper blade, wherein the bearing ring extends around the dome surface; and
- causing, by the one or more processors, the wiper blade assembly to move in a second direction around the dome surface by rotating the bearing ring in the second direction and thereby moving the wiper blade from the deployed condition to the stowed condition, and wherein the second direction is opposite of the first direction.

8. The method of claim 7, wherein the first direction is a clockwise direction and the second direction is a counter-clockwise direction.

9. The method of claim 7, further comprising adjusting, by the one or more processors, a speed that the wiper blade assembly rotates about the dome surface.

10. The method of claim 7, wherein the signal is a first signal, the method further comprising:
- receiving, by the one or more processors, a second signal indicating that optical deterrents are cleared from the dome surface; and
- wherein the one or more processors are further configured to causing the wiper blade assembly to move in the second direction in response to receiving the second signal.

11. The method of claim 7, wherein rotating the bearing ring in a first direction includes rotating a drive motor in a third direction that corresponds to the first direction.

12. A system of determining a position of a wiper blade as the wiper blade rotates around a dome, the system comprising:
- a position sensor;
- the dome; and
- one or more processors configured to:
  - receive a signal from the position sensor indicating detection of the wiper blade at a first position relative to the dome;
  - access information about a speed of the wiper blade as the wiper blade rotates around the base of the dome; and
  - determine a second position of the wiper blade relative to the dome based upon the speed; and
  - based on the determined second position, cause fluid to be dispensed through a spray nozzle when the wiper blade is at a pre-determined position.

13. The system of claim 12, wherein the signal is a first signal, the one or more processors are further configured to:
- receive a second signal from a second position sensor indicating a position of a drive motor relative to the wiper blade; and
- determine the second position of the wiper blade based upon the second signal and the speed of the wiper blade.

14. The system of claim 12, wherein the one or more processors are further configured to:
- access information about a position of a spray nozzle relative to the dome;
- access information about the pre-determined position of the wiper blade relative to the spray nozzle; and
- determine when the wiper blade is at the pre-determined position based upon the position of the spray nozzle relative to a current position of the wiper blade.

15. The system of claim 12, wherein the one or more processors are further configured to activate a fluid dispensing system, including the spray nozzle in order to cause fluid to be dispensed through the spray nozzle.

16. The system of claim 12, wherein the spray nozzle is a plurality of spray nozzles, including a first spray nozzle and a second spray nozzle and the one or more processors are further configured to:
- access information about a first pre-determined position of the wiper blade relative to the first spray nozzle and a second pre-determined position of the wiper blade relative to the second spray nozzle;
- cause fluid to be dispensed through the first spray nozzle when the wiper blade is at the first pre-determined position; and
- cause fluid to be dispensed through the second spray nozzle when the wiper blade is at the second pre-determined position.

17. The system of claim 12, wherein the one or more processors are further configured to control the speed of the wiper blade.

18. The system of claim 12 further comprising a vehicle, wherein the dome is attached to the vehicle.

19. The system of claim 18, wherein the dome is configured as a housing for at least one sensor configured to detect objects in an external environment of the vehicle.

* * * * *